US011883338B2

(12) United States Patent
Harrison

(10) Patent No.: US 11,883,338 B2
(45) Date of Patent: Jan. 30, 2024

(54) CASTER WHEEL ASSEMBLY

(71) Applicant: BRINTAL LIMITED, St. Sampsons (GG)

(72) Inventor: Brian Harrison, St. Andrew (GG)

(73) Assignee: BRINTAL LIMITED ( * ) Notice: Subject to any disclaimer, the term of this patent is extended or adjusted under 35 U.S.C. 154(b) by 808 days.

(21) Appl. No.: 16/967,511

(22) PCT Filed: Jan. 17, 2019

(86) PCT No.: PCT/EP2019/051193
§ 371 (c)(1),
(2) Date: Aug. 5, 2020

(87) PCT Pub. No.: WO2019/149541
PCT Pub. Date: Aug. 8, 2019

(65) Prior Publication Data
US 2021/0145669 A1 May 20, 2021

(30) Foreign Application Priority Data
Feb. 5, 2018 (GB) .................................. 1801811

(51) Int. Cl.
B60B 33/00 (2006.01)
A61G 5/10 (2006.01)
(Continued)

(52) U.S. Cl.
CPC ............ A61G 5/10 (2013.01); B60B 33/0002 (2013.01); B60B 33/0028 (2013.01);
(Continued)

(58) Field of Classification Search
CPC ................ A61G 2203/726; A61G 5/10; A61G 5/1005; A61G 5/04; A61G 5/042;
(Continued)

(56) References Cited

U.S. PATENT DOCUMENTS 3,023,825 A * 3/1962 Rabjohn .............. A61G 5/1051
180/209
2002/0030343 A1* 3/2002 Schaffner ................. A61G 5/06
280/250.1
(Continued)

FOREIGN PATENT DOCUMENTS

CN 2723510 Y 9/2005
CN 1989016 A * 6/2007 ......... B60B 33/0021
(Continued)

OTHER PUBLICATIONS

PCT/EP2019/051193, "International Search Report and Written Opinion," dated May 17, 2019, 12 pages.

Primary Examiner — Paul N Dickson
Assistant Examiner — Matthew D Lee
(74) Attorney, Agent, or Firm — Dorsey & Whitney LLP

(57) ABSTRACT

A caster-wheel assembly (100; 200) for a vehicle, for example a wheelchair or powered wheelchair. The caster-wheel assembly comprises a switch (13) coupled to a housing (3); a castering wheel bracket (9) configured to receive a wheel (10), wherein the bracket is rotatably mounted about a caster pivot axis (28) with respect to the housing; biasing means (15) configured to provide a biasing force such that the wheel bracket is biased away from the housing; and a switch-actuating member (13) coupled to the wheel bracket such that movement of the wheel bracket towards the housing and against the biasing force causes the switch-actuating member to actuate the switch.

26 Claims, 4 Drawing Sheets

(51) Int. Cl.
*B60B 33/04* (2006.01)
*H01H 13/18* (2006.01)
*A61G 5/04* (2013.01)

(52) U.S. Cl.
CPC ...... *B60B 33/0039* (2013.01); *B60B 33/0049* (2013.01); *B60B 33/0068* (2013.01); *B60B 33/0094* (2013.01); *B60B 33/045* (2013.01); *H01H 13/18* (2013.01); *A61G 5/04* (2013.01); *A61G 5/101* (2013.01); *A61G 2203/70* (2013.01); *B60B 33/0057* (2013.01); *B60B 2200/22* (2013.01); *B60B 2900/3315* (2013.01)

(58) Field of Classification Search
CPC ............... A61G 5/101; A61G 2203/70; B60B 33/0078; B60B 33/0002; B60B 33/0028; B60B 33/0039; B60B 33/0049; B60B 33/045; B60B 33/0057; B60B 2200/22; B60B 2900/3315; B60B 2200/26; H01H 13/18; G08B 21/22
See application file for complete search history.

(56) References Cited

U.S. PATENT DOCUMENTS

2017/0050467 A1* 2/2017 Sigal .................... B60B 33/026
2023/0157913 A1* 5/2023 Derenne .................. A61G 7/08
5/600

FOREIGN PATENT DOCUMENTS

| JP | 2006204606 A | * | 8/2006 | |
| JP | 2007283082 A | * | 11/2007 | |
| JP | 2008213504 A | * | 9/2008 | |
| JP | 3167094 U | * | 4/2011 | ............... A61G 5/08 |
| KR | 101534077 B1 | | 7/2015 | |
| WO | WO-2016080807 A1 | * | 5/2016 | ............... A61G 5/08 |

* cited by examiner

CASTER WHEEL ASSEMBLY

CROSS REFERENCE TO RELATED APPLICATIONS

This application claims the benefit of priority to Great Britain application no. 1801811.9 filed 5 Feb. 2018 entitled "A caster wheel assembly," which is hereby incorporated herein by reference in its entirety. This application is a national phase filing of PCT international patent application no. PCT/EP2019/051193 filed 17 Jan. 2019 entitled "A caster wheel assembly," which is hereby incorporated herein by reference in its entirety.

BACKGROUND

The present invention relates to a caster wheel assembly. In particular, but not exclusively, the present invention may be embodied as a caster wheel assembly for a wheeled device such as a vehicle or a wheelchair, or such as a powered vehicle, such as a powered wheelchair. The present invention may also be embodied as a wheeled device comprising the caster wheel assembly, a vehicle comprising the caster wheel assembly or a wheelchair comprising the caster wheel assembly.

There are many different designs of powered mobility wheelchairs with swivelling front caster wheels, but the two main types are 'Attendant Chairs' whereby a carer operates the vehicle standing behind the occupant's seat, and 'Power Chairs" which have wheel driven electrical motors to power, or propel, the chair along, the propulsion being controlled by the occupant. These vehicles are usually powered by electric motors via a simple axle through the rear wheels. Caster wheels are also used in many other wheeled devices and vehicles.

There are many risks and dangers associated with caring for a wheelchair or power chair occupant, many of whom are vulnerable people. There are many accidents involving tipping of power chairs, which can make carers and the users themselves feel uncomfortable with taking this responsibility. Operating a small and lightweight high torque vehicle at even slow speed has significant risk, particularly on an incline, making the vehicle even more susceptible to tipping.

If the vehicle suddenly tips back, as they have a propensity to do due to their lightweight, in some cases just due to the occupant shifting their weight around, a 'wheelie' bar may be provided, or anti tip wheel which will dig in and prevent complete rotation of the wheelchair. But the momentum gathered by the time the vehicle tilts sufficiently such that the wheelie bar or anti tip wheel engages with the ground, and the jolt of hitting the stop can be a big shock for the user. Furthermore, the sensation of falling backwards can also be a distressing shock for the occupant.

Furthermore, as the front wheels leave the ground, the occupant or attendant will not necessarily shut the throttle off, as they desperately try to hold on, thus continuing to operate the motor, exacerbating the dangerous situation by causing further rotation of the chair due to the motor's torque.

The use of fully rotatable caster wheels on the front of powered mobility products is well known in the prior art and the problem with wheelchairs tipping over is also well known. In an attempt to prevent both powered and manual wheelchairs from tipping over backwards, various designs and attempts have been made to address this issue. Previous attempts focus on adding a trailing wheel attached to an extra chassis member, which contacts the ground when the wheelchair reaches a given angle.

US2002/0093172 A1 discloses an adjustable height anti-tip wheel for a power wheelchair.

Although these simple devices may mechanically prevent a powered wheelchair from flipping right over, as the wheelchair starts tipping, they allow momentum to build up right to the 'stop' point at which the anti-tip wheel hits the ground, and they do not take into account any motor-powered motor management and safety thereof. They are also cumbersome whilst sticking out the rear of the vehicle, making it difficult for an attendant to push the wheelchair and problematic going down steps. There therefore exists the need to provide a simple solution of cutting electrical, or motor power as soon as, or even before, the front caster wheels leave the ground. In at least this respect, it can be appreciated that the present invention substantially departs from conventional concepts and designs of the prior art. Furthermore, there exists the need to provide a suitable, safe and inexpensive anti-tip solution which activates as soon as the front caster wheels start leaving the ground, switching off motor power and, if required, also applying electromagnetic motor brake systems.

SUMMARY

The present invention aims to alleviate, at least to a certain extent, the problems and/or address at least to a certain extent the difficulties with the prior art.

According to a first aspect of the present invention, there is provided a caster-wheel assembly for a vehicle, for example a wheelchair or powered wheelchair, the caster-wheel assembly comprising:
  a switch coupled to a housing;
  a castering wheel bracket configured to receive a wheel, wherein the bracket is rotatably mounted about a caster pivot axis with respect to the housing;
  biasing means configured to provide a biasing force such that the wheel bracket is biased away from the housing; and
  a switch-actuating member coupled to the wheel bracket such that movement of the wheel bracket towards the housing and against the biasing force causes the switch-actuating member to actuate the switch.

In this manner, the present invention provides a simple and effective means of determining when the wheeled device, such as a vehicle, such as a wheelchair or powered wheelchair (but may be any other suitable vehicle or other wheeled device, such as a trolley, pram, etc), is in a tip condition, or is about to tip, or when the vehicle is unoccupied by a passenger. Thus, the switch may be configured to e.g. engage or disengage or vary (e.g. increase or decrease) the power of a power supply of the vehicle, for example a propulsion means, a propulsive power supply for propelling the vehicle or of any other power supply, for example of an electrical system of the vehicle, or additionally or alternatively engage or disengage (either partially or fully) a braking means of the vehicle according to the extent to which the vehicle is about to tip or a wheel thereof is about to break, or has broken, contact with the ground. The propulsive power supply may optionally be an electrical propulsive power supply and, as such, the vehicle may be an electrically propelled vehicle, e.g. wheelchair, and may optionally comprise a battery or other suitable electrical power source for providing a propulsive power source of the vehicle. The switch may additionally or alternatively be for engaging or for disengaging, or configured to engage or configured to disengage, a motor of the vehicle, for example an electric motor. The switch may optionally be a lockless switch. The present invention also provides a means of actuating a switch while also enabling the wheel to freely and indefinitely caster and so rotate about the pivot axis without entangling cables or wires which may otherwise be required for attachment to a switch. Although in the examples of both example embodiments, the wheel is a caster wheel, any other suitable wheel can be used, including non-castering wheels. The caster-wheel assembly of all embodiments of the present invention may optionally be a swivel caster-wheel assembly, the caster wheel bracket may optionally be a swivel caster wheel bracket, and the caster wheel may optionally be a swivel caster wheel. The caster wheel assembly may also optionally be a locking caster wheel or any other such suitable type of caster wheel assembly. The switch-actuating member may optionally be configured such that the switch is actuated by the switch-actuating member upon the switch-actuating member moving a predetermined distance towards the housing. Optionally, the biasing means may be configured to provide a biasing force such that the wheel bracket is biased away from the switch and the switch-actuating member may optionally be coupled to the wheel bracket such that movement of the wheel bracket towards the switch and against the biasing force causes the switch-actuating member to actuate the switch, thus the housing is a non-essential feature. Optionally, the switch-actuating member may be coupled to the wheel bracket such that, when the vehicle or wheeled device is loaded (e.g. such that the caster-wheel assembly supports a weight of the vehicle above a predetermined value), the bracket moves towards the switch or housing and against the biasing force such that the actuating-member actuates the switch. The vehicle or wheeled device may be considered to be loaded when an occupant is in the vehicle or when the vehicle or wheeled device carries cargo or a load, thus the predetermined value may correspond to each or both of these conditions.

Optionally, the switch is for disengaging, or configured to disengage, a power supply for supplying propulsive power to the vehicle or is for engaging, or is configured to engage, a braking means of the vehicle. Thus, the invention can be configured to prevent tipping by disengaging a propulsive power supply of the vehicle when the vehicle is about to tip, for example when a wheel thereof is about to break contact with the ground.

Optionally, movement of the wheel bracket towards the housing and against the biasing force causes the switch-actuating member to move towards the switch so as to actuate the switch. Thus, a simple and reliable means of actuating a switch according to the load through the caster-wheel assembly is provided.

Optionally, the switch-actuating member actuates the switch by contacting the switch. Thus, for example, the switch-actuating member may actuate the switch by directly contacting the switch or alternative means for actuating the switch according to the movement of the actuating member may additionally or alternatively be provided, for example optical means for determining the position of the actuating member (in such an example, the switch may optionally be an optical switch).

Optionally, movement of the wheel bracket towards the housing causes the actuating member to slide along the pivot axis of the wheel bracket. Optionally, the actuating member may be generally or substantially coaxial with the pivot axis of the wheel bracket. In some embodiments, this may provide for a caster-wheel assembly which is able to actuate the switch while simultaneously allowing the caster-wheel to rotate about the pivot axis (i.e. the caster pivot axis) entirely (i.e. 360 degrees) or indefinitely (i.e. an unlimited number of rotations of the caster-wheel about the pivot axis).

Optionally, the switch-actuating member is slidingly received within the housing. Thus, the switch-actuating member, or optionally a portion thereof, may be hidden within the housing, thereby providing a more compact assembly.

Optionally, the assembly comprises a caster pivot shaft. Thus, the pivot axis may be provided by a caster pivot shaft, however other means of providing a pivot axis may be used, for example a linkage mechanism. The caster pivot shaft may be cylindrical or may be any other suitable shape or cross-section.

Optionally, the caster pivot shaft comprises a threaded portion towards each opposing end of the caster pivot shaft configured for receiving a nut for retaining the caster pivot shaft within the housing. Thus, in some examples, the caster pivot shaft is located a fixed distance with respect to the housing and may not be slidable with respect thereto or along a longitudinal axis thereof.

Optionally, the caster pivot shaft comprises a bore and wherein the switch-actuating member is coaxial with the bore of the caster pivot shaft. A strong and sturdy caster pivot shaft is thereby provided while also providing a means of actuating the switch without limiting the rotation of the caster-wheel about the pivot axis. The switch-actuating member may optionally be provided within the caster pivot shaft so as to be freely-moveable therealong, for example the switch-actuating member maybe slidable within the caster pivot shaft along a longitudinal axis of the caster pivot shaft.

Optionally, the switch-actuating member is slidingly received within the bore of the caster pivot shaft. A strong and sturdy caster pivot shaft is thereby provided while also providing a means of actuating the switch without limiting the rotation of the caster-wheel about the pivot axis. Optionally, the switch-actuating member may be a rod having a diameter substantially or generally corresponding to the internal diameter of the bore.

Optionally, the caster pivot shaft is coupled to the switch-actuating member or is integrally formed with the switch-actuating member. Optionally, the switch-actuating member may be a switch-actuating portion of the caster pivot shaft. Thus, a simpler assembly is provided.

Optionally, the biasing means comprises a spring, optionally a compression spring.

Optionally, the castering wheel bracket comprises mounting means for mounting a caster wheel thereto. Thus, the assembly may optionally comprise a caster wheel mounted to the castering wheel bracket. In some embodiments, the castering wheel bracket may comprise two or more caster wheels which may optionally configured to caster independently or may be configured to caster together.

Optionally, the castering wheel bracket comprises two spaced apart legs configured to receive a caster wheel therebetween. The two spaced apart legs may each comprise an aperture for receiving an axle of the caster wheel or other such means for affixing a caster wheel thereto.

Optionally, the caster pivot axis of the wheel bracket is substantially perpendicular to the rotational axis of the wheel. The pivot axis may also be offset from the rotational axis of the wheel. Such a configuration may provide a castering effect.

Optionally, the wheel bracket is pivotably coupled with respect to the housing. For example, the bracket may optionally be hingedly coupled with respect to the housing. For example, the coupling may comprise a pin for providing the hinged coupling.

Optionally, the wheel bracket comprises a limiter for limiting the extent to which the wheel bracket and the housing are spaced apart by the biasing means. Thus, the wheel bracket and the housing are limited to a maximum spaced apart distance thereby holding at least some of the components of the assembly together.

Optionally, the limiter comprises a pin slidably received within a slot. Thus, a simple and effective means of providing a limiter is provided.

Optionally, the switch is an electrical switch. Such a switch may provide an effective means of operating electrical systems and equipment, such as an electrical propulsive power source of the vehicle or electric, or electrically-operated, braking means of the vehicle. The switch may optionally be a micro switch. The switch may optionally be a lockless switch, for example a lockless micro switch.

Optionally, the caster pivot shaft is rotatably coupled to the housing by at least one bearing.

Optionally, the caster pivot shaft or the switch-actuating member is coupled to the housing by a linear bearing and a thrust bearing. Such a configuration provides a particularly sturdy pivot axle and enables the pivot axle, or a portion thereof, to act as the switch-actuating member as the pivot axle may thus be configured to slide longitudinally along the housing and thus along the pivot axis (the longitudinal axis of the housing may be generally or substantially aligned or coaxial with the pivot axis). The thrust bearing may instead be an angular bearing or an angular thrust bearing. The thrust bearing may optionally be spaced apart from the linear bearing or may be adjacent to the linear bearing. The pivot shaft may optionally be slidably received within the linear bearing and the thrust bearing.

Optionally, the wheel bracket is configured to rotate entirely and indefinitely about the pivot axis. Thus, the wheel bracket may optionally rotate a full 360 degrees around the pivot axis, and may optionally rotate an unlimited number of times (i.e. complete an unlimited number of full, 360 degree rotations) about the pivot axis.

Optionally, the housing is configured for attachment to a chassis of a vehicle. Optionally, the housing may be a part of the vehicle chassis, for example it may optionally be a part of the vehicle chassis for attachment of a wheel or wheel bracket. Optionally, the housing may comprise mounting means for mounting the housing to a chassis of a vehicle. Thus, the present invention may easily be retrofitted to existing vehicles or other wheeled devices.

According to a second aspect of the present invention, there is provided a vehicle comprising the caster-wheel assembly of any preceding claim, the vehicle comprising a vehicle chassis and wherein the vehicle chassis comprises the housing.

Optionally, the housing is integral with the vehicle chassis. Optionally, the housing may be a part of the vehicle chassis, for example it may optionally be a part of the vehicle chassis for attachment of a wheel or wheel bracket.

Optionally, the vehicle is a wheelchair, for example a powered wheelchair. Optionally, the wheelchair may be an electrically propelled wheelchair and/or may be an attendant controlled wheelchair.

According to a third aspect of the present invention, there is provided a caster-wheel assembly for a vehicle, for example a wheelchair or powered wheelchair, the caster-wheel assembly comprising:

chassis mounting means for mounting the caster-wheel assembly to a chassis of a vehicle;

a castering wheel bracket comprising wheel mounting means for mounting a wheel thereto; and a load-sensitive switch for disengaging a propulsion means of the vehicle, or engaging a braking means of the vehicle, when a compressive force acting between the chassis mounting means and the wheel mounting means falls below a predetermined value, for example when an occupant leaves the vehicle or when a wheel of the caster-wheel assembly breaks contact with the ground.

Thus, the present invention relates to a caster-assembly which is capable of disengaging the propulsion means of a vehicle, such as an electric motor, when the weight of the vehicle supported by the caster-wheel assembly falls below a predetermined value, such as when the vehicle is unoccupied or when the vehicle is about to tip. The switch may alternatively or additional be configured for electrical connection to an electrical system, for example for providing an indication corresponding to the weight transmitted through or supported by the caster-wheel assembly, for example the switch may be configured to be connected to an electrical system for illuminating a light for indicating a tip condition of the vehicle. The compressive force may correspond to the weight of the vehicle supported by the caster-wheel assembly. The load-sensitive switch may also be referred to as weight-sensitive switch or pressure-sensitive switch. Optionally, the switch may be a load cell.

In this manner, the present invention provides a simple and effective means of determining when the wheeled device, such as a vehicle, such as a wheelchair or powered wheelchair (but may be any other suitable vehicle or other wheeled device, such as a trolley, pram, etc), is about to tip, or is about to tip, or when the vehicle is unoccupied by a passenger. Thus, the switch may be configured to e.g. engage or disengage or vary (e.g. increase or decrease) the power of a power supply of the vehicle, for example a propulsion means, a propulsive power supply for propelling the vehicle or of any other power supply, for example of an electrical system of the vehicle, or additionally or alternatively engage or disengage (either partially or fully) a braking means of the vehicle according to the extent to which the vehicle is about to tip or a wheel thereof is about to break, or has broken, contact with the ground. The propulsive power supply may optionally be an electrical propulsive power supply and, as such, the vehicle may be an electrically propelled vehicle and may optionally comprise a battery or other suitable electrical power source for providing a propulsive power source of the vehicle. The switch may additionally or alternatively be for engaging or for disengaging, or configured to engage or configured to disengage, a motor of the vehicle, for example an electric motor. The switch may optionally be a lockless switch. The present invention also provides a means of actuating a switch while also enabling the wheel to freely and indefinitely caster and so rotate about the pivot axis without entangling cables or wires which may otherwise be required. Although in the examples of both example embodiments, the wheel is a caster wheel, any other suitable wheel can be used, including non-castering wheels.

Optionally, the switch may alternatively or additionally be configured to engage a power supply for supplying propulsive power to the vehicle or is configured to disengage a power supply for supplying propulsive power to the vehicle and/or is for engaging, or is configured to engage, a braking means of the vehicle. Thus, in some examples, the switch may be configured to engage a braking means of the vehicle when the compressive force, for example the weight supported by the caster-wheel assembly, falls below a predetermined value. Thus, the invention can be configured to prevent tipping by disengaging a propulsive power supply of the vehicle when the vehicle is about to tip, for example when a wheel thereof is about to break contact with the ground.

Optionally, the switch is coupled to a housing; the castering wheel bracket is rotatably mounted about a caster pivot axis with respect to the housing; the caster-wheel assembly further comprising: biasing means configured to provide a biasing force such that the wheel bracket is biased away from the housing; and a switch-actuating member coupled to the wheel bracket such that movement of the wheel bracket towards the housing and against the biasing force causes the switch-actuating member to actuate the switch. The caster-wheel assembly of all embodiments of the present invention may optionally be a swivel caster-wheel assembly, the caster wheel bracket may optionally be a swivel caster wheel bracket, and the caster wheel may optionally be a swivel caster wheel. The caster wheel assembly may also optionally be a locking caster wheel or any other such suitable type of caster wheel assembly. The switch-actuating member may optionally be configured such that the switch is actuated by the switch-actuating member upon the switch-actuating member moving a predetermined distance towards the housing.

Optionally, movement of the wheel bracket towards the housing and against the biasing force causes the switch-actuating member to move towards the switch so as to actuate the switch. Thus, a simple and reliable means of actuating a switch according to the load through the caster-wheel assembly is provided.

Optionally, the switch-actuating member actuates the switch by contacting the switch. Thus, for example, the switch-actuating member may actuate the switch by directly contacting the switch or alternative means for actuating the switch according to the movement of the actuating member may alternatively be provided, for example optical means for determining the position of the actuating member (in such an example, the switch may optionally be an optical switch).

Optionally, movement of the wheel bracket towards the housing causes the switch-actuating member to slide along the pivot axis of the wheel bracket. Optionally, the actuating member may be generally or substantially coaxial with the pivot axis of the wheel bracket. In some embodiments, this may provide for a caster-wheel assembly which is able to actuate the switch while simultaneously allowing the caster-wheel to rotate about the pivot axis (i.e. the caster pivot axis) entirely (i.e. 360 degrees) or indefinitely (i.e. an unlimited number of rotations of the caster-wheel about the pivot axis).

Optionally, the switch-actuating member is slidingly received within the housing. Thus, the switch-actuating member, or optionally a portion thereof, may be hidden within the housing, thereby providing a more compact assembly.

Optionally, the assembly comprises a caster pivot shaft. Thus, the pivot axis may be provided by a caster pivot shaft, however other means of providing a pivot axis may be used, for example a linkage mechanism. The caster pivot shaft may be cylindrical or may be any other suitable shape or cross-section.

Optionally, the caster pivot shaft comprises a threaded portion towards each opposing end of the pivot shaft configured for receiving a nut for retaining the caster pivot shaft within the housing. Thus, in some examples, the caster pivot shaft is located a fixed distance with respect to the housing and may not be slidable with respect thereto or therealong.

Optionally, the caster pivot shaft comprises a bore and wherein the switch-actuating member is coaxial with the bore of the caster pivot shaft. A strong and sturdy caster pivot shaft is thereby provided while also providing a means of actuating the switch without limiting the rotation of the caster-wheel about the pivot axis. The switch-actuating member may optionally be provided within the caster pivot shaft so as to be freely-moveable therealong, for example the switch-actuating member maybe slidable within the caster pivot shaft along a longitudinal axis of the caster pivot shaft.

Optionally, the switch-actuating member is slidingly received within the bore of the caster pivot shaft. A strong and sturdy caster pivot shaft is thereby provided while also providing a means of actuating the switch without limiting the rotation of the caster-wheel about the pivot axis. Optionally, the switch-actuating member may be a rod having a diameter substantially or generally corresponding to the internal diameter of the bore.

Optionally, the caster pivot shaft is coupled to the switch-actuating member or is integrally formed with the switch-actuating member. Optionally, the switch-actuating member may be a switch-actuating portion of the caster pivot shaft. Thus, a simpler assembly is provided.

Optionally, the biasing means comprises a spring, optionally a compression spring. Thus, the assembly may optionally comprise a caster wheel mounted to the castering wheel bracket. In some embodiments, the castering wheel bracket may comprise two or more caster wheels which may optionally be independently castering or may caster together.

Optionally, the castering wheel bracket comprises two spaced apart legs configured to receive a caster wheel therebetween. The two spaced apart legs may each comprise an aperture for receiving an axle of the caster wheel or other such means for affixing a caster wheel thereto.

Optionally, the caster pivot axis of the wheel bracket is substantially perpendicular to the rotational axis of the wheel. The pivot axis may also be offset from the rotational axis of the wheel. Such a configuration may provide a castering effect.

Optionally, the wheel bracket is pivotably coupled with respect to the housing. For example, the bracket may optionally be hingedly coupled with respect to the housing. For example, the coupling may comprise a pin for providing the hinged coupling.

Optionally, the wheel bracket comprises a limiter for limiting the extent to which the wheel bracket and the housing are spaced apart by the biasing means. Thus, the wheel bracket and the housing are limited to a maximum spaced apart distance thereby holding at least some of the components of the assembly together.

Optionally, the limiter comprises a pin slidably received within a slot. Thus, a simple and effective means of providing a limiter is provided.

Optionally, the switch is an electrical switch. The switch may optionally be a lockless switch, for example a lockless micro switch.

Optionally, the caster pivot shaft is rotatably coupled to the housing by at least one bearing.

Optionally, the caster pivot shaft or the switch-actuating member is coupled to the housing by a linear bearing and a thrust bearing. Such a configuration provides a particularly sturdy pivot axle and enables the pivot axle, or a portion thereof, to act as the switch-actuating member as the pivot axle may thus be configured to slide longitudinally along the housing and thus along the pivot axis (the longitudinal axis of the housing may be generally or substantially aligned or coaxial with the pivot axis). The thrust bearing may instead be an angular bearing or an angular thrust bearing. The thrust bearing may be spaced apart from the linear bearing or may be adjacent to the linear bearing. The pivot shaft may be slidably received within the linear bearing and the thrust bearing.

Optionally, the wheel bracket is configured to rotate entirely and indefinitely about the pivot axis. Thus, the wheel bracket may optionally rotate a full 360 degrees around the pivot axis, and may optionally rotate an unlimited number of times (i.e. complete an unlimited number of full, 360 degree rotations) about the pivot axis.

Optionally, the housing is configured for attachment to a chassis of a vehicle. Optionally, the housing may be a part of the vehicle chassis, for example it may optionally be a part of the vehicle chassis for attachment of a wheel or wheel bracket. Optionally, the housing may comprise mounting means for mounting the housing to a chassis of a vehicle. Thus, the present invention may easily be retrofitted to existing vehicles or other wheeled devices.

According to a fourth aspect of the present invention, there is provided a wheeled device comprising the caster-wheel assembly of the third aspect.

Optionally, the wheeled device is a vehicle, the vehicle comprising a vehicle chassis and wherein the vehicle chassis comprises the housing.

Optionally, the housing is integral with the vehicle chassis.

According to a fifth aspect of the present invention, there is provided a wheeled device comprising the caster-wheel assembly of the third aspect.

Optionally, the wheeled device is a vehicle.

Optionally, the vehicle is a wheelchair, for example a powered wheelchair.

For the purpose of explanation, it is understood that those who are skilled in the art will be familiar with a simple caster wheel assembly as used on wheelchairs, usually comprising a fork leg either side of a wheel, positioned on an axle in-between, with a caster rake employed to give the wheel a caster trail suitable for the specific application. Most wheelchair caster wheels use a standard vertical pivot shaft with two main bearings slid into a tubular section of chassis, to both support the weight of the vehicle and allow smooth rotation of the fork leg and wheel in relation to the vehicle chassis.

The current invention is described in two main modes, with firstly the vehicle unoccupied, and secondly with an occupant in the vehicle, as weight on the caster wheels determines the switch position.

BRIEF DESCRIPTION OF THE DRAWINGS

The present invention may be carried out in various ways and a preferred embodiment of a caster-wheel assembly in accordance with the invention will now be described by way of example with reference to the accompanying drawings, in which.

DETAILED DESCRIPTION

In some examples, the present invention may provide a castor wheel assembly, fork, spring, sliding shaft and switch assembly, incorporating a spring assisted, pressure activated electrical switch mechanism, suitable for use on, but not exclusively, wheelchairs and power chairs with caster front wheels. The assembly can be retrofitted to many existing mobility vehicles, to prevent rear wheel powered vehicles from tipping over backwards, by cutting out the motor power as soon as the front caster wheels leave the ground. This also disables the vehicle when there is no occupant onboard, removing other risks of accidental use. The switch can also be connected to any required electrical system, including for example the magnetic spring assisted braking systems used on many mobility products, as those skilled in the art will be familiar with.

In some examples, the present invention may relate in some examples to a pressure or load activated electrical switch mechanism incorporated within a caster wheel assembly, suitable for use in powered attendant wheelchairs and user controlled power wheelchairs, incorporating a switch which is activated by the occupants weight in or out of the vehicle, irrespective of the wheels particular caster position, to enable and disable electrical or associated power or brake systems in the event of either one or more caster wheels leaving the ground.

The present invention may also optionally relate in some examples to a fully rotatable castor wheel, pivoting fork, spring, and sliding shaft, incorporating a spring assisted, pressure or load activated electrical switch mechanism, designed primarily for use on, but not exclusively, wheelchairs and power chairs with caster front wheels. The present invention may be retrofitted to many existing mobility vehicles, and may be configured to prevent rear wheel powered vehicles from tipping over backward, by switching power off or a brake on, or a combination of both, as the front caster wheels start to become unloaded, or leave the ground.

Although specific embodiments of the present invention are shown in FIGS. 1 to 4, it will be appreciated by the skilled person that the present invention may be carried out in various ways and the present invention is not limited to the specific arrangement of components in FIGS. 1 to 4.

Figure 1:
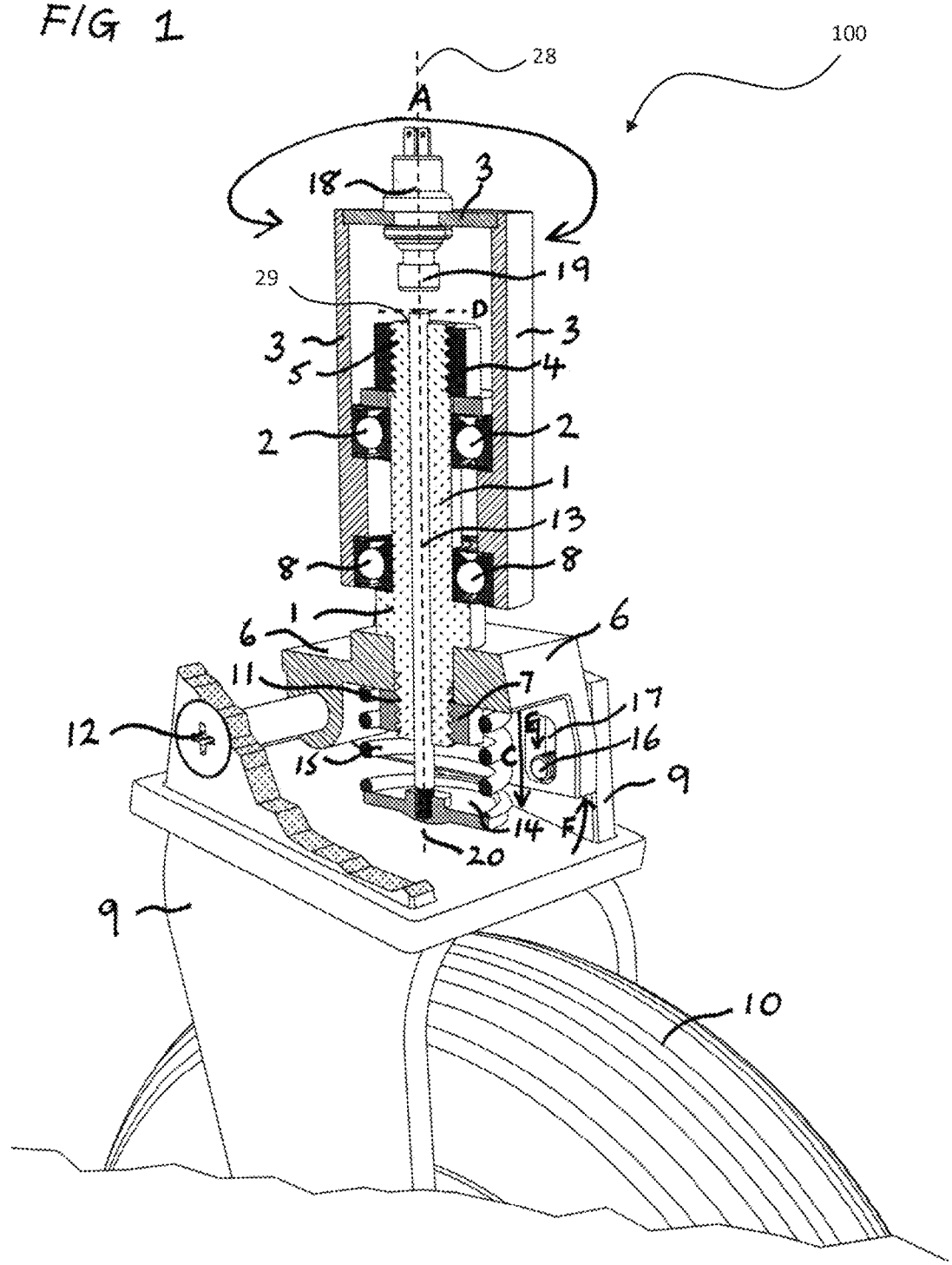
FIG. 1 is a cross-sectional view of a caster-wheel assembly according to a first embodiment of the invention in a first, or unloaded or partially unloaded, position in which the wheel bracket is spaced apart from the housing, and thereby a switch-actuating member is spaced away from the switch, by way of a biasing means. This position corresponds to a reduced compressive load configuration where the compressive force through the assembly, i.e. between the vehicle chassis and the ground, is reduced below a predetermined value, for example when the vehicle is unoccupied or when the vehicle is occupied but the chassis is tilted such that the vehicle is about to tip and thus the spring is less compressed than in the loaded configuration. In the position of FIG. 1, the switch is not activated.
Figure 2:
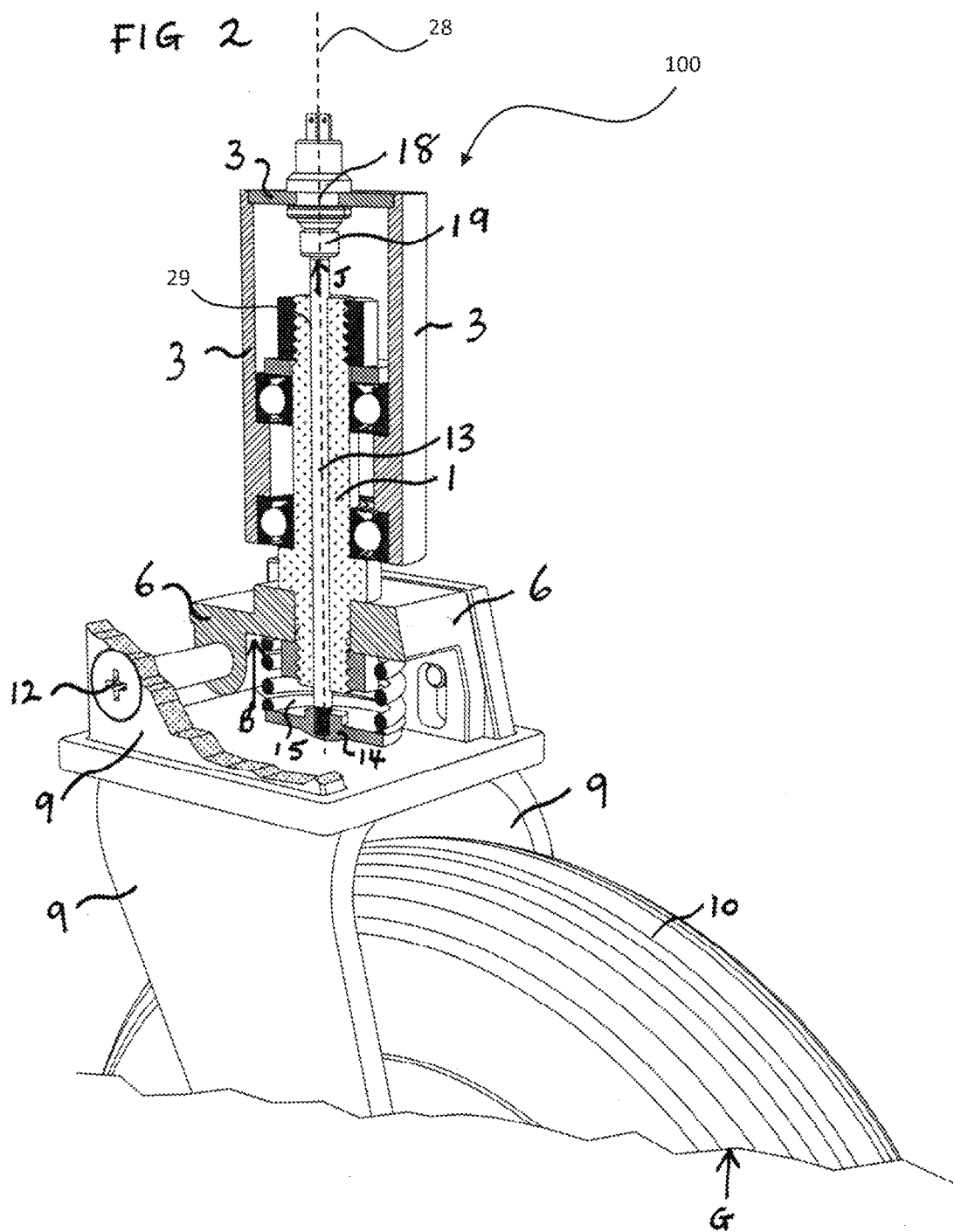
FIG. 2 is a cross-sectional view of the embodiment of FIG. 1 in a second, loaded configuration in which there is an increased compressive force through the assembly, for example when the vehicle is occupied and is not about to tip. Thus, FIG. 2 corresponds to a position where the compressive load is above a predetermined value. In this position, the switch is activated or depressed as it is contacted by a switch-actuating member as a result of the moving together of the wheel bracket and the housing.
Figure 3:
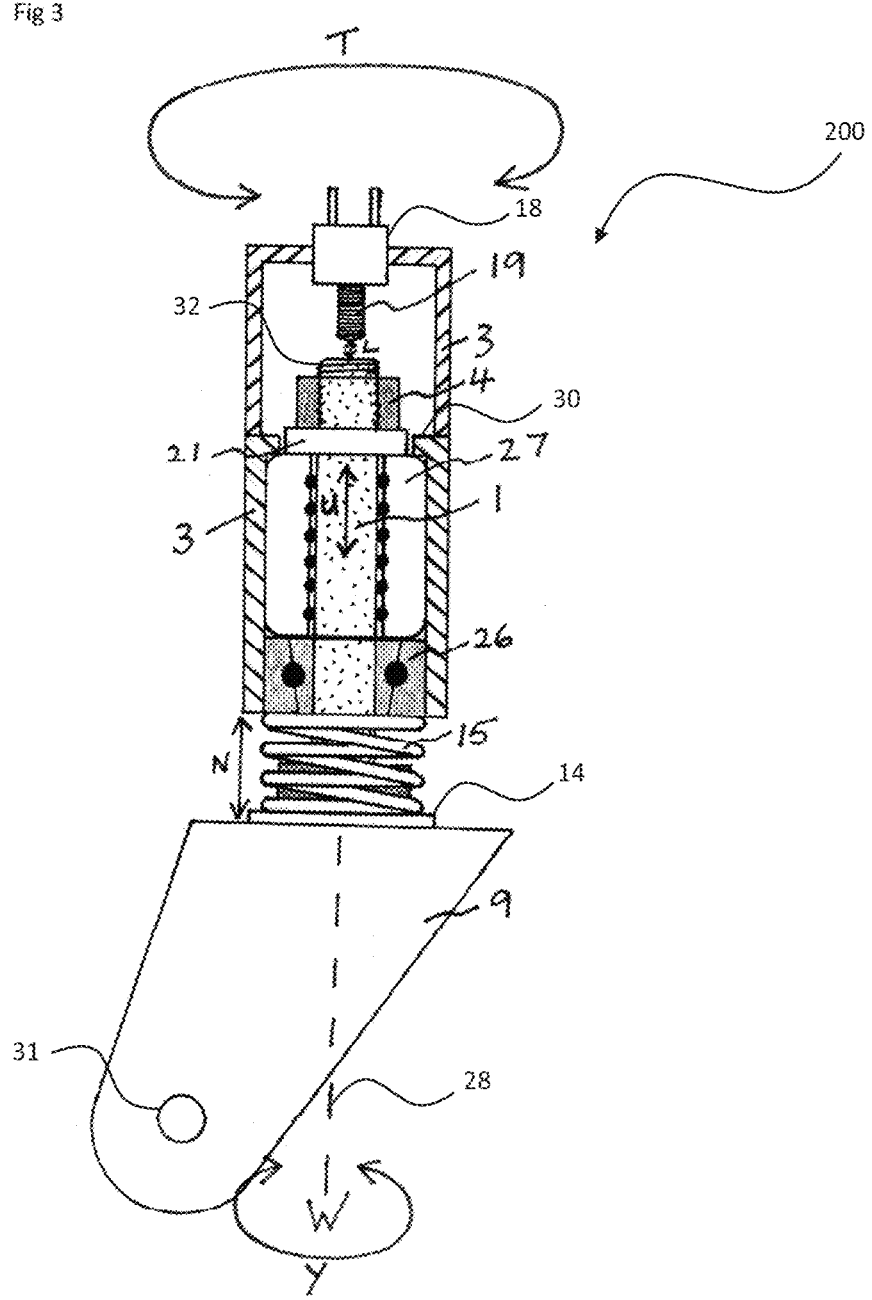
FIG. 3 is a cross-sectional view of a caster-wheel assembly according to a second embodiment of the present invention in the first, or unloaded or partially unloaded, position in which the wheel bracket is spaced apart from the housing, and thereby a switch-actuating member is spaced away from the switch, by way of a biasing means. In this position the vehicle would be unoccupied, with the switch not activated. In the second embodiment, the caster pivot shaft acts as the switch-actuating member as it is slidingly received within the housing so as to be slidable towards and away from the switch.
Figure 4:
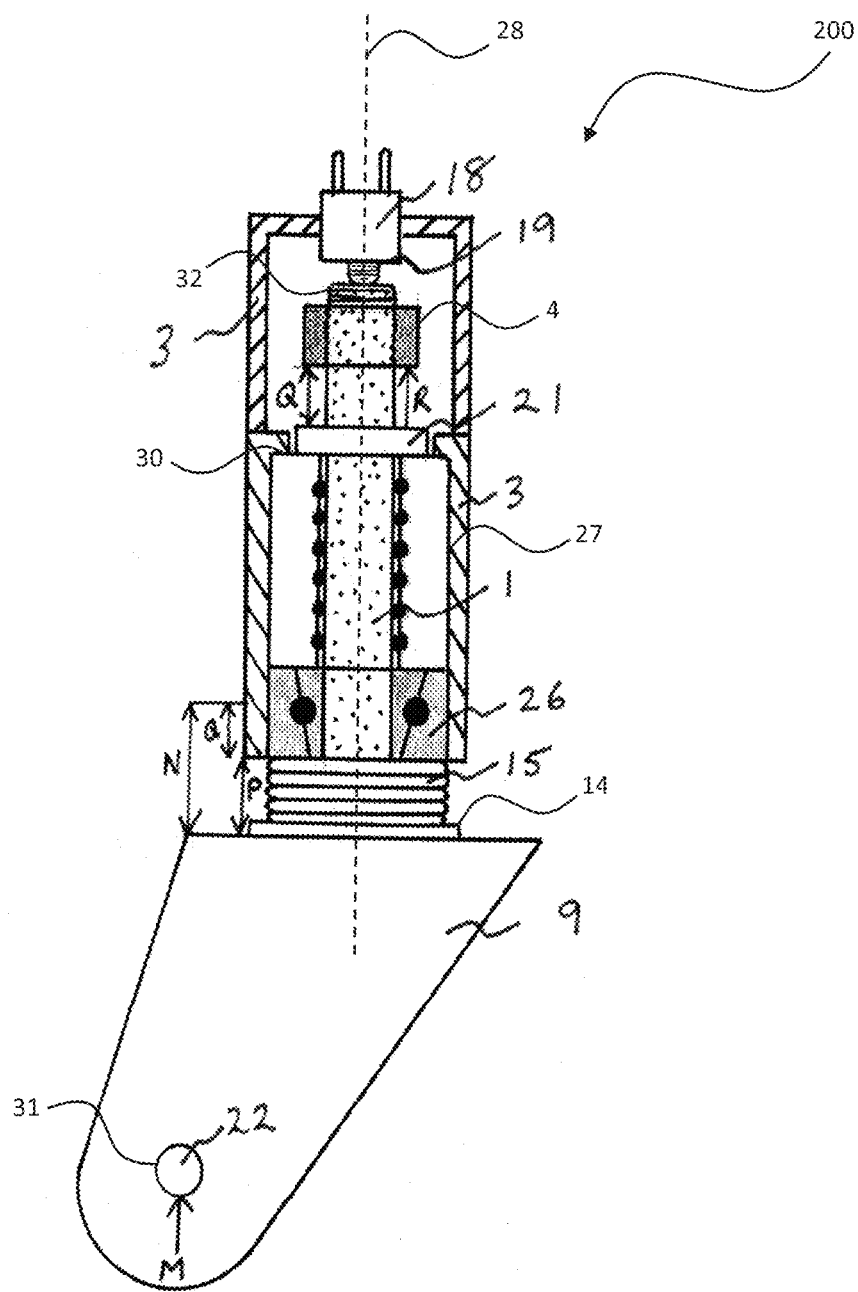
FIG. 4 is a cross-sectional view of the embodiment of FIG. 3 in the second, loaded configuration in which there is an increased compressive force through the assembly, for example when the vehicle is occupied and is not about to tip. In this position, the switch is activated as it is contacted by a switch-actuating member as a result of the moving together of the wheel bracket and the housing, which causes the swivel axle to slide within the housing such that a switch-actuating portion thereof contacts the switch. In this position the vehicle is occupied, with the switch activated.

In both of the embodiments shown in FIGS. 1 and 3, in either of the unloaded positions of FIGS. 1 and 3 and in the loaded positions of FIGS. 2 and 4 respectively, and optionally in any intermediate position therebetween, the caster wheels are able to fully rotate on the caster pivot shaft through 360 degrees and the wheel to function freely. As such, the wheel or wheel bracket is not pivotally or rotationally locked in any position, although examples wherein the wheel is rotationally and/or pivotally locked in at least one position of the loaded or unloaded positions are also envisaged.

An example of a caster-wheel assembly 100 for a vehicle according to a first embodiment of the invention is shown in FIG. 1. In FIG. 1, the caster-wheel assembly 100 is shown in a switch-disengaged position or configuration which may occur when, for example, the vehicle is loaded above a predetermined value (for example, when an occupant is seated in the vehicle) or when the vehicle is loaded but about to tip such that the caster wheel has just broken or is about to break contact with the ground. When the caster wheel assembly 100 is provided on a front of the vehicle, the vehicle in FIG. 1 may be about to tip backwards or sideways. In all embodiments of the present invention, the caster-wheel assembly may be used with a wheeled device for example a vehicle or a wheelchair (such as a powered wheelchair).

A caster wheel 10 is mounted to castering wheel bracket 9. In the example shown, the castering wheel bracket 9 comprises a generally U-shape or fork comprising two generally planar and parallel and spaced-apart legs for receiving a caster wheel therebetween. Although in the example shown, only one wheel 10 is attached to the castering wheel bracket 9, the castering wheel bracket 9 may comprise a plurality of wheels 10 attached or mounted thereto. The spaced-apart legs are adjoined by a plate 20 generally affixed perpendicular to the legs so as to form a generally U-shape.

A switch 18 is coupled, attached or mounted to a housing 3. Although in the examples shown, a vehicle chassis comprises housing 3, housing 3 does not need to be a part of the vehicle chassis and may instead be any suitable housing such as a housing of the switch 18 or a separate housing. The switch 18 in FIG. 1 is attached or coupled to housing 3 as it is located within an aperture provided within the housing 3. Any suitable switch 18 may be used and in the embodiments of FIGS. 1 and 3 an electrical switch is used, for example a micro switch. The switch 18 may be coupled to a power supply or source, such as a motive or propulsive power supply or source, such as an electric motor or battery and may be configured to engage, or in some embodiments disengage, the power supply or source upon actuation of the switch 18. In the embodiments shown, when the switch is depressed it engages or activates an electric motor and when it is released it disengages or deactivates an electric motor. The switch 18 may additionally or alternatively be coupled to a braking means of the wheelchair or vehicle such that when switch 18 is depressed the braking means is disengaged or deactivated and when switch 18 is released the braking means is engaged or activated.

The castering wheel bracket 9 is spaced apart from housing 3 in the position of FIG. 1. In the example shown, castering wheel bracket 9 is rotatably or hingedly coupled to a coupling member 6 by a hinged connection 12 comprising pin 12, although other means of providing a rotatable or hinged coupling are also envisaged. Housing 3 may comprise coupling member 6 or wheel bracket 9 may comprise coupling member 6. Coupling member 6 is freely rotatable about a caster pivot axis 28 of the assembly 100 and is rotationally coupled to the wheel bracket 9 about the caster pivot axis 28, although examples are envisaged wherein coupling member 6 is not freely rotatable about a caster pivot axis 28 of the assembly 100 but is instead rotationally coupled to the housing 3 and is freely rotatable about a caster pivot axis 28. Thus, in the example shown, coupling member 6 is configured to rotate with castering wheel bracket 9 about caster pivot axis 28.

A biasing means 15 is configured to bias the wheel bracket 9 away from the housing 3 and thereby to bias the switching-actuating member 9 away from the switch 18. In the example shown, the biasing means 15 also biases the wheel bracket away from the coupling member 6 and, as such, the biasing means 15 is provided between the wheel bracket 9 and the coupling member 6 and may provide a biased hinged coupling 12 between wheel bracket 9 and coupling member 6. In the examples shown, the biasing means 15 comprises a compression spring 15 but any other suitable biasing means may be used.

A limiter 16 is configured to limit the extent to which the wheel bracket 9 may be spaced away from housing 3, switch 18 or coupling member 6 by biasing means 15. Advantageously, limiter 16 prevents the wheels from rotating too far about the hinged coupling 12 with respect to coupling 6 and so may also be referred to as a rotation limiter 16. In the example shown, limiter 16 comprises a pin 16 slidingly engaged in a slot 17 (as indicated by arrow E). The pin 16 is coupled to, or may be integral with, the wheel bracket 9 and the slot is provided in the coupling member 6, however examples wherein the pin is coupled to, or integral with, the coupling member 6 and the slot is provided in the wheel bracket 9 are also envisaged. In the configuration or position of FIG. 1, castering wheel bracket 9 is spaced away from housing 3 by biasing means 15 to its maximum extent.

Castering wheel bracket 9 is rotatable with respect to housing 3 (as indicated by arrow A) about a caster pivot axis 28 which in the example shown is provided by a caster pivot shaft 1. Caster pivot shaft 1 is received, at least partially, within an internal space of housing 3 and comprises a threaded portion 5, 11 provided at each opposing end of the caster pivot shaft 1. Nuts 4, 7 engage the respective threaded portions so as to hold pivot shaft 1 in place within housing 3 and against coupling member 6. Fastening means other than nuts could instead be used. Bearings 2, 8 (for example, ball bearings) longitudinally spaced apart along the pivot shaft 1 and received within the housing 3 against shoulders provided therein facilitate the rotatable coupling between the pivot shaft 1 and the housing 3. As mentioned elsewhere, housing 3 may be a part of a vehicle chassis or wheelchair chassis and may optionally be a tubular section of the chassis.

The pivot shaft 1 comprises a longitudinal through-bore 29 through which a switch-actuating member 13 is slidably received. The through-bore 29 is coaxial with the pivot axis and so both the switch-actuating member 13 and the pivot shaft 1 are generally or substantially coaxial with the pivot axis, and the switch-actuating member 13 is generally or substantially coaxial with pivot shaft 1. The switch-actuating member 13 is coupled to the caster wheel bracket 9 such that movement of the caster wheel bracket 9 towards the housing 3 or rotation of the caster wheel bracket 9 about pivotable coupling 12 towards coupling member 6 causes the switch-actuating member 13 to move towards the switch 18 and to contact the switch 18 so as to actuate it. In the example shown, switch-actuating member 13 comprises a shaft or rod 13, although other shapes or configurations are also envisaged. A washer 14 is attached or coupled to a distal end of the switch-actuating member 13 so as to enable the washer 14 to slide along the upper surface of the plate 20 as bracket 19 rotates about pivotable coupling 12. In the example shown, the washer is arranged so as to be located within the annular space of the compression spring 15, and so is sized accordingly however this is an entirely optional aspect as the spring 15 may be arranged instead so as to sit on top of the washer 14 or in any other location. The switch-actuating member 13 is also located within the annular space of the compression spring 15, however this is also an optional arrangement.

Thus, the present invention provides a caster-wheel assembly which is fully and freely rotatable with respect to a vehicle chassis 3 and comprising a switch 18 which is actuatable according to the load from the vehicle (i.e. weight of the vehicle passing) through the caster wheel assembly, through the caster wheel 10 and to the ground.

In the position shown in FIG. 1, as the actuating member 13 is spaced away from the switch 18 by biasing means 15, the actuating member 13 does not contact switch 18 and so the switch 18 is released. When the switch 18 is released it may disengage a motive or propulsive power supply, source or means so as to prevent the vehicle from being powered. In this way, the vehicle may be prevented from tipping as the power supply to an electric motor is stopped or reduced to thereby reduce the torque supplied by an electric motor contributing to the tipping action. In other examples, the switch 18 may be configured for other purposes, for example to illuminate a light or other such means for indicating that the vehicle is about to tip. In still other examples, the switch 18 may be configured to disengage a braking means of the vehicle or wheelchair when the switch is released (i.e. in the position of FIG. 1).

Turning now to FIG. 2, a switch-depressed position of the caster wheel assembly 100 is shown. This position corresponds to a loaded configuration in which there is an increased (i.e. above a predetermined value) compressive force through the assembly, which may correspond to for example when the vehicle is occupied by a passenger and is not about to tip. In this position, the weight of the vehicle causes the wheel bracket 9 to move towards the housing 3 and switch 18. In the example shown, this movement causes the bracket 9 to rotate about pivotable coupling 12 (or hinged connection 12), thereby overcoming the biasing force provided by the biasing means 15 biasing the bracket 9 away from the coupling member 6, the housing 3 and biasing the actuating member 13 away from the switch 18 and causing actuating member 13 to slide along the longitudinal axis of the through-bore of the pivot shaft 1 so as to move towards switch 18 so as to engage switch 18 such that switch 18 is actuated by switch 18 being depressed. When switch 18 is depressed it may enable power to be supplied to a motive or propulsive power supply or means so as to enable the vehicle to be propelled. Alternatively or additionally, it may also disengage a braking means of the vehicle.

At all times, from the position of FIG. 1 to the position of FIG. 2 and at any and all intermediate positions therebetween, the caster wheel bracket 9 is freely rotatable with respect to the housing 3 and so can swivel independently of the vehicle chassis.

A caster-wheel assembly 200 according to a second embodiment of the invention is shown in FIGS. 3 and 4. The second embodiment of the present invention is similar to the first embodiment with some differences being that the wheel bracket 9 is not rotatably coupled to the housing 3 (although this is not essential), bearings are provided by a thrust bearing (or angular bearing) and a linear bearing and that the pivot shaft 1 itself (or a portion thereof) serves as the switch-actuating member 13. As such, identical reference numerals are generally used. The second embodiment is therefore simpler than the first embodiment in the respect that the actuating member 13 is integral with the pivot shaft 1.

FIG. 3 is similar to FIG. 1 in that both show the caster-wheel assembly in an unloaded (or reduced load, i.e. the compressive force is below a predetermined value) position in which the vehicle is without an occupant and so is supported by the biasing means or the vehicle is occupied and is about to tip, in any case a reduced compressive load is transmitted through the caster-wheel assembly from the weight of the vehicle. As such, the switch 18 is in a disengaged position (i.e. it is disengaged by the switch-actuating member 13). Castering wheel bracket 9 is rotatable with respect to the housing 3 about caster pivot axis 28, as indicated by arrows T and Y. Caster pivot axis 28 is provided by caster pivot shaft 1, although other means could instead be used to provide the caster pivot axis 28, such as a linkage mechanism. A biasing means 15 biases wheel bracket 9 away from housing 3 and may bias pivot shaft 1 (and the switch-actuating member 13 thereof) away from switch button 19. The biasing means 15 comprises a compression spring 15 but any other suitable biasing means may be used. As mentioned elsewhere, housing 3 may be a part of a vehicle or wheelchair chassis and may optionally be a tubular section.

In the position or configuration shown in FIG. 3, as the actuating member 13 (i.e. switch-actuating portion 32 of caster pivot shaft 1) is spaced away from the switch 18 by biasing means 15, the actuating member 13 does not contact switch 18 and so the switch 18 is released. When the switch 18 is released it may disengage a motive or propulsive power supply, source or means so as to prevent the vehicle from being powered. In this way, in some embodiments, the vehicle is prevented from tipping as the power supply to an electric motor is stopped or reduced to thereby reduce the torque supplied by an electric motor contributing to the tipping action. In other examples, the switch 18 may be configured for other purposes, for example to illuminate a light or other such means for indicating that the vehicle is about to tip. In still other examples, the switch 18 may be configured to disengage a braking means of the vehicle or wheelchair when the switch is released (i.e. in the position of FIG. 3).

Pivot shaft 1 is rotationally coupled to bracket 9 so as to rotate therewith, although examples wherein the pivot shaft 1 is not rotationally coupled to bracket 9 are also envisaged. Pivot shaft 1 is slidingly received within housing 3 and passes through, and is supported by a thrust bearing 26 and a linear bearing 27. Thrust bearing 26 and linear bearing 27 are arranged coaxially adjacent to one another, although examples wherein they are spaced apart along the longitudinal axis of the pivot shaft 1 are also envisaged. Thus, thrust bearing 26 and linear bearing 27 are arranged about the caster pivot shaft 1 and are generally or substantially coaxial therewith. This arrangement enables full support of the pivot shaft 1 while also enabling it to slide with respect to the housing, for example along or in a direction generally or substantially parallel to, the caster pivot axis 28. Linear bearing 27 is located axially within housing 13 by a shoulder 30 provided in housing 13. Linear bearing 27 and thrust bearing 26 are arranged so that they are coaxial with each other and they may also be arranged to be coaxial with the caster pivot axis 28.

Pivot shaft 1 comprises a threaded portion 5 towards a distal end thereof to which a nut 4 is attached and washer 21 sits between nut 4 and linear bearing 27 so as to be sandwiched therebetween. The biasing force provided by the biasing means 15 causes the nut 4 to be held against the washer 21 to provide a compressive force compressing the nut 4 against the washer 21 and the washer 21 against the linear bearing 27. The biasing means also biases the pivot shaft 1 away from the switch 18 so as to maintain a spaced apart relationship therebetween.

Pivot shaft 1 is coupled to wheel bracket 9 such that movement of the wheel bracket 9 towards housing 18, as indicated by arrow N, causes pivot shaft 1 to move towards switch 18, as indicate by arrow U, so that a switch-actuating portion 32 thereof actuates switch 18, for example by engaging switch 18.

As in the first embodiment, the caster wheel bracket 9 comprises two spaced-apart legs (not shown) for receiving a caster wheel 10 therebetween. Wheel bracket 9 similarly also comprises mounting means 31 for mounting a caster wheel 10 thereto. Wheel bracket 9 may be the same as that of the first embodiment, and it may even include the hinged connection 17 of the first embodiment and optionally also a limiter, for example the pin 16 and slot 17 arrangement of the first embodiment. Pivot shaft 1 may also be attached or coupled to the wheel bracket in the same way as in the first embodiment.

As in the first embodiment, switch 18 is coupled, attached or mounted to a housing 3. Although in the examples shown, a vehicle chassis comprises housing 3, housing 3 does not need to be a part of the vehicle chassis and may instead be any suitable housing such as a housing of the switch 18 or a separate housing. Switch 18 is attached or coupled to housing 3 as it is located within an aperture provided within the housing 3. Any suitable switch 18 may be used and in the embodiments of FIGS. 1 and 3 an electrical switch is used, for example a micro switch. The switch 18 may be coupled to a power supply or source, such as a motive or propulsive power supply or source, such as an electric motor or battery and may be configured to engage, or in some embodiments disengage, the power supply or source upon actuation of the switch 18. In the examples shown, when the switch is depressed it engages or activates an electric motor and when it is released it disengaged or deactivates an electric motor. The switch 18 may additionally or alternatively be coupled to a braking means of the wheel chair such that when switch 18 is depressed the braking means is disengaged or deactivated and when switch 18 is released the braking means is engaged or activated.

The position shown in FIG. 4 corresponds to a switch-depressed position of the caster wheel assembly 200. This position corresponds to a loaded configuration in which there is an increased compressive force (i.e. above a predetermined value) through the assembly, for example when the vehicle is occupied by a passenger and is not about to tip. In this position, the weight of the vehicle causes the wheel bracket 9 to move towards the housing 3 and thereby towards the switch 18. Thus, the biasing force provided by the biasing means 15 biasing the bracket 9 away from the housing 3 and biasing the actuating member 13 away from the switch 18 is overcome and the pivot shaft 1 is caused to slide along caster pivot axis 28 so as to move towards switch 18. Movement of the pivot shaft 1 towards switch 18 causes the switch-actuating member 13 to engage switch 18 to depress switch 18 such that switch 18 is actuated. When switch 18 is depressed (i.e. actuated) it may enable power to be supplied to a motive or propulsive power supply or means so as to enable the vehicle to be propelled. Alternatively or additionally, it may also disengage a braking means of the vehicle. In the second embodiment, switch-actuating member 13 may be integrally formed with the caster pivot shaft 1 or may be a switch-actuating portion 32 of the caster pivot shaft 1.

At all times, from the position of FIG. 3 to the position of FIG. 4 and at any and all intermediate positions therebetween, the caster wheel bracket 9 is freely rotatable with respect to the housing 3 and so can swivel independently of the vehicle chassis.

It is envisaged that the person skilled in the art may make various changes to the embodiments specifically described above without departing from the scope of the invention.

The invention claimed is:

1. A caster-wheel assembly for a vehicle, the caster-wheel assembly comprising:
    a housing;
    a switch coupled to the housing, the switch being configured to disengage or engage a propulsion means or a braking means of the vehicle;
    a castering wheel bracket configured to receive a wheel, wherein the castering wheel bracket is rotatably mounted about a caster pivot axis with respect to the housing;
    biasing means configured to provide a biasing force such that the castering wheel bracket is biased away from the housing; and
    a switch-actuating member coupled to the castering wheel bracket such that movement of the castering wheel bracket towards the housing and against the biasing force causes the switch-actuating member to actuate the switch.

2. The caster-wheel assembly of claim 1, wherein movement of the castering wheel bracket towards the housing and against the biasing force causes the switch-actuating member to move towards the switch so as to actuate the switch.

3. The caster-wheel assembly of claim 1, wherein movement of the castering wheel bracket towards the housing causes the switch-actuating member to slide along the pivot axis of the castering wheel bracket.

4. The caster-wheel assembly of claim 1, wherein the switch-actuating member is slidingly received within the housing.

5. The caster-wheel assembly claim 1, wherein the caster-wheel assembly further comprises a caster pivot shaft.

6. The caster-wheel assembly of claim 5, wherein the caster pivot shaft comprises a threaded portion towards each opposing end of the pivot shaft configured for receiving a nut for retaining the caster pivot shaft within the housing.

7. The caster-wheel assembly of claim 6, wherein the caster pivot shaft comprises a bore and wherein the switch-actuating member is coaxial with the bore of the caster pivot shaft.

8. The caster-wheel assembly of claim 7, wherein the switch-actuating member is slidingly received within the bore of the caster pivot shaft.

9. The caster-wheel assembly of claim 5, wherein the caster pivot shaft is coupled to the switch-actuating member or is integrally formed with the switch-actuating member.

10. The caster-wheel assembly of claim 1, wherein the castering wheel bracket is hingedly coupled with respect to the housing.

11. The caster-wheel assembly of claim 1, wherein the castering wheel bracket comprises a limiter for limiting an extent to which the castering wheel bracket and the housing are spaced apart by the biasing means.

12. The caster-wheel assembly of claim 5, wherein the caster pivot shaft or the switch-actuating member is coupled to the housing by a linear bearing and a thrust bearing.

13. The caster-wheel assembly of claim 1, wherein the castering wheel bracket is configured to rotate entirely and indefinitely about the caster pivot axis.

14. The vehicle of claim 1 comprising the caster-wheel assembly of claim 1 and a vehicle chassis wherein the housing is configured for attachment to the vehicle chassis.

15. The caster-wheel assembly of claim 1, wherein the vehicle is a powered wheelchair.

16. The vehicle of claim 1 comprising the caster wheel assembly of claim 1 and a vehicle chassis, wherein the vehicle chassis comprises the housing.

17. The vehicle of claim 1 comprising the caster wheel assembly of claim 1 and a vehicle chassis, wherein the housing is integral with the vehicle chassis.

18. A caster-wheel assembly for a vehicle, the caster-wheel assembly comprising:
  a chassis mounting means for mounting the caster-wheel assembly to a chassis of the vehicle;
  a castering wheel bracket comprising a wheel mounting means for mounting a wheel thereto; and
  a load-sensitive switch configured to disengage a propulsion means of the vehicle, or engage a braking means of the vehicle, when a compressive force acting between the chassis mounting means and the wheel mounting means falls below a predetermined value.

19. The caster-wheel assembly of claim 18, wherein:
the switch is coupled to a housing;
the castering wheel bracket is rotatably mounted about a caster pivot axis with respect to the housing; and
the caster-wheel assembly further comprises:
  a biasing means configured to provide a biasing force such that the wheel bracket is biased away from the housing; and
  a switch-actuating member coupled to the castering wheel bracket such that movement of the castering wheel bracket towards the housing and against the biasing force causes the switch-actuating member to actuate the switch.

20. The caster-wheel assembly of claim 19, wherein movement of the castering wheel bracket towards the housing causes the switch-actuating member to slide along the pivot axis of the castering wheel bracket.

21. The caster-wheel assembly of claim 19, wherein
  the assembly comprises a caster pivot shaft having a threaded portion toward each opposing end of the pivot shaft configured for receiving a nut for retaining the caster pivot shaft within the housing;
  the caster pivot shaft defines a bore;
  the switch-actuating member is coaxial with the bore of the caster pivot shaft; and
  the switch-actuating member is slidingly received within the bore of the caster pivot shaft.

22. The caster-wheel assembly of claim 21, wherein the caster pivot shaft is coupled to the switch-actuating member or is integrally formed with the switch-actuating member.

23. The caster-wheel assembly of claim 18, wherein the castering wheel bracket is configured to rotate entirely and indefinitely about the pivot axis.

24. The caster-wheel assembly of claim 11, wherein the limiter comprises a pin slidably received within a slot.

25. The caster-wheel assembly of claim 18, wherein the vehicle is a wheelchair or powered wheelchair.

26. The caster-wheel assembly of claim 18, wherein the load-sensitive switch is configured to disengage the propulsion means or engage the braking means when an occupant leaves the vehicle or engage the braking means when a wheel of the caster-wheel assembly breaks contact with a ground surface.

* * * * *